Figure 1:
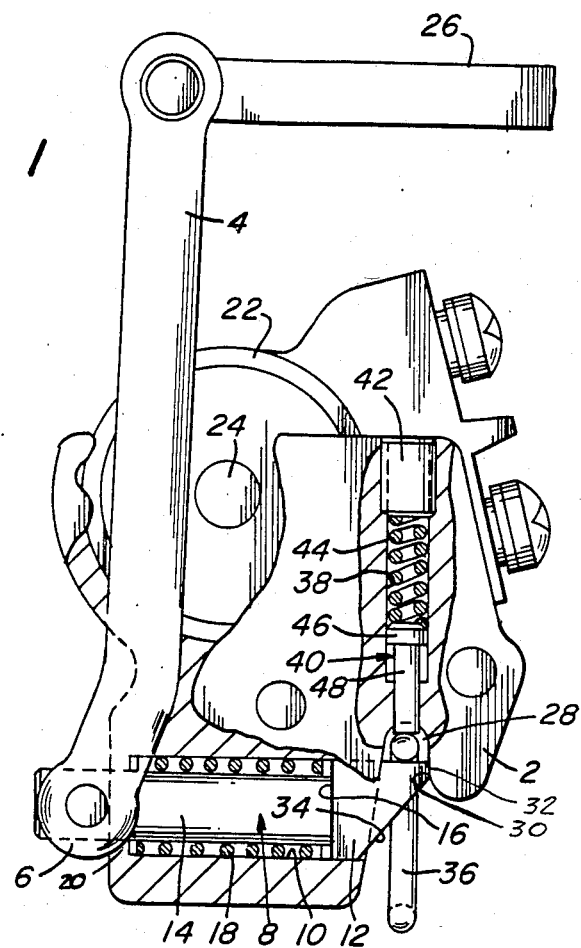

United States Patent [19]

Brown et al.

[11] Patent Number: 4,682,530

[45] Date of Patent: Jul. 28, 1987

[54] AIRBORNE STORES ARMING TRIGGER UNIT AND METHOD OF PREVENTING UNDESIRED ARMING

[75] Inventors: James R. Brown; Gary S. Lane; Wallace H. Larson, all of Jamestown, N. Dak.

[73] Assignee: Western Gear Corporation, Jamestown, N. Dak.

[21] Appl. No.: 869,390

[22] Filed: May 30, 1986

[51] Int. Cl.⁴ .................... F16F 65/02; F14F 5/02
[52] U.S. Cl. ................ 89/1.55; 294/82.26; 294/82.35
[58] Field of Search ............... 89/1.55, 1.51; 294/82.26, 82.35, 82.17, 82.21, 82.23

[56] References Cited

U.S. PATENT DOCUMENTS

| | | | |
|---|---|---|---|
| 4,088,055 | 5/1978 | West et al. | 89/1.55 |
| 4,102,520 | 7/1978 | Hasquenoph et al. | 294/82.26 X |
| 4,266,462 | 5/1981 | Carter et al. | 89/1.55 |
| 4,453,622 | 6/1984 | Betz | 294/82.35 X |

FOREIGN PATENT DOCUMENTS

| | | | |
|---|---|---|---|
| 3030041 | 2/1982 | Fed. Rep. of Germany | 294/82.35 |
| 2563490 | 10/1985 | France | 89/1.55 |

Primary Examiner—David H. Brown

[57] ABSTRACT

An arming trigger unit having a retractable member for selectively retaining or releasing an arming wire of a store which retractable member is, after having been released, retained in its release position by a safety member. Further, such safety member engages a ring portion of the arming wire such that ejection of the ring portion is assisted when the arming wire is released. Such safety member is movable out of the position at which it retains the retractable member to permit a subsequent arming wire to be retained by the retractable member. A method of maintaining an actuating member for a store in a selected position to release an unarmed store by moving a safety member into a position whereat said actuating member is retained in such selected position. Further, the method of installing a store with respect to an aircraft by releasing a safety member to permit an actuating member to captively retain an arming wire.

16 Claims, 2 Drawing Figures

U.S. Patent  Jul. 28, 1987  4,682,530

AIRBORNE STORES ARMING TRIGGER UNIT AND METHOD OF PREVENTING UNDESIRED ARMING

BACKGROUND OF THE INVENTION

At present it is common practice for the military services of various nations to transport stores, such as bombs, rockets and guided missles, by aircraft to selected locations. For obvious safety reasons such stores are carried on an aircraft in an unarmed or non-explosive condition, subject to being armed during launch to provide an armed or live store. Most stores are armed during their launch by pulling a lanyard from the store by means of a trigger unit having a movable lanyard pin about which the lanyard is looped. With the lanyard pin in the open position the looped lanyard falls with the store and the store is unarmed. With the lanyard pin being stationary (closed position) the loop is retained on the pin and the lanyard is withdrawn from the store so that an armed store is dropped. What is believed to be the most relevant prior trigger unit structure is shown in U.S. Pat. No. 4,266,462 which is incorporated herein by reference to better understand the structure and method of the invention described herein. It is to be recognized that other trigger units having a movable lanyard pin are also known. The prior trigger units had various disadvantages which are overcome by the structure and method of this invention. First, with prior trigger units it is possible, due to shock during a store launch, that the mechanism which unlatches in order to initiate release of a store may move back towards the latched position before the launch of a store is completed. Such movement could move the lanyard pin into its closed position before the loop has cleared the lanyard pin so that the lanyard is retained rather than released. It is also possible that the lanyard loop will be captively engaged by the lanyard pin moving towards the closed position to retain the lanyard and thus launch an armed store when the launch of an unarmed store is intended. Obviously the undesired launch of an armed store could have undesired results. Further, in securing the lanyard to the store during the period a store is attached to an aircraft it is not always possible to see whether the lanyard loop encircles the lanyard pin due to the store being in the line of vision. The lanyard latch mechanism must be set as a secondary operation after the lanyard loop is inserted into the triggering unit. Consequently, with at least some prior trigger units it is not possible to determine whether the lanyard loop is positioned for proper operation since no visual check can be made.

BRIEF DESCRIPTION OF THE INVENTION

The invention of this application provides a structure in which a latch pin is supported in a trigger unit to move between the free end of a lanyard pin and the housing of a trigger unit upon movement of the lanyard pin in a direction to release the lanyard ring from the lanyard pin. In addition the latch pin occupies the space through which the lanyard pin moves during release to lock the lanyard pin from relatching a released lanyard. Further, during the attachment process of a store to an aircraft and the trigger unit, the lanyard ring is caused to be in proper position when the lanyard pin is released, thusly preventing improper lanyard retention. A further advantage of the invention is that the action of installing the lanyard ring releases the lanyard pin to permit the lanyard pin to move to its latched position without requiring any additional action. Further, the concept of this invention provides a new method of launching an armed store in which a physical means is movable between the end of the lanyard pin and the housing to insure that an accidental armed launch does not occur.

Accordingly, one object of this invention is to provide a new and improved arming trigger unit having a movable means to prevent undesired movement of the lanyard pin.

Another object of this invention is to provide a new and improved method of operating an arming trigger unit to prevent an accidental launch of an armed store.

A more specific object of this invention is to provide a new and improved arming trigger unit having a movable latch pin to prevent undesired movement of a lanyard pin.

A specific object of this invention is to provide a trigger unit with a spring biased stop which moves between the free end of a lanyard pin and the housing of the trigger unit when the lanyard pin is retracted with reference to the housing.

Another specific object of this invention is to provide a lanyard ring for a trigger unit which lanyard ring during installation automatically sets the latch pin and allows the lanyard pin to move into a position to hold the lanyard ring without requiring additional action.

A specific object of this invention is to provide a positive displacement of the arming lanyard when the lanyard pin retracts by having the latch pin occupy the space in which the lanyard pin was located and ejects the lanyard ring from its stored position.

Figure 2:
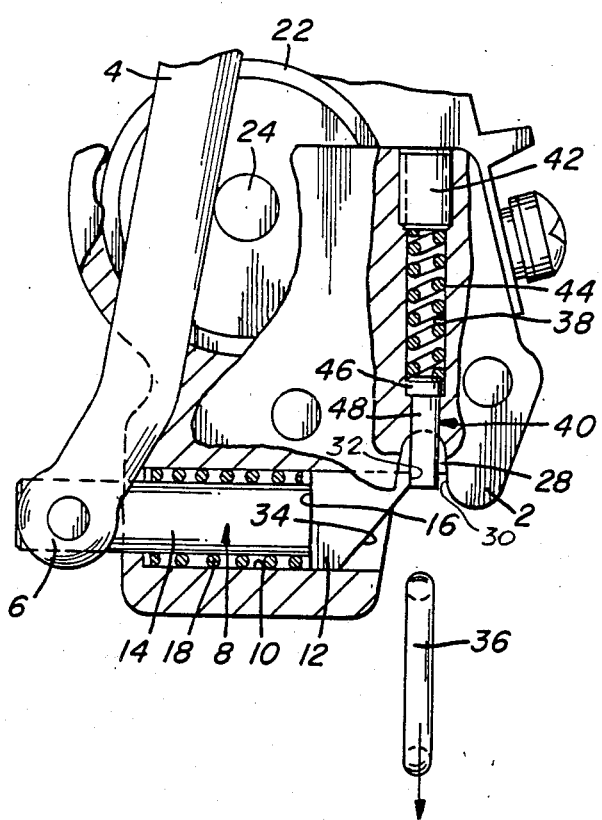

These and other objects of this invention will become more apparent upon consideration of the following detailed description and illustrations of the presently preferred embodiment thereof, in which:

FIG. 1 is a side elevational view of an arming trigger unit constructed in accordance with the principles of this invention with portions thereof broken away to more clearly illustrate the structure thereof and with the lanyard pin thereof in the closed position; and FIG. 2 is a side elevational view of the lower portion of the trigger unit as shown in FIG. 1 showing the lanyard pin in the open position.

DESCRIPTION OF THE PRESENTLY PREFERRED EMBODIMENT

As is known, see U.S. Pat. No. 4,266,462, a known arming trigger unit comprises a rigid, formed housing 2 which pivotably supports the lower end of an elongated lever 4 at the lower portion thereof by means of a lever pivot 6 carried by a lanyard pin 8. Pin 8 is a formed elongated member suitably slidably received in an elongated open ended bore 10 extending horizontally through the lower portion of housing 2. Pin 8 has a forward formed head portion 12 which is of a suitable configuration to be closely slidably received in bore 10 and an elongated stem portion 14 which extends rearwardly of head portion 12 with the outer surface of portion 14 being inwardly offset from the outer surface of head portion 12 to form a radially extending annular land 16 therebetween. A suitable open convolution elongated helical spring 18 axially encompasses cylindrical portion 14 with the forward end thereof being in engagement with land 16. A suitable retaining means 20 is suitably secured within the rearward end of bore 10 to engage the rearward end of spring 18 and retain spring 18 within bore 10. An electrically energizable solenoid 22 is suitably secured to housing 2 and has a normally (solenoid 22 being deenergized) outwardly extending solenoid plunger 24 the outer surface of which is adjacent an intermediate portion of the forwardly facing surface of lever 4. The upper end of lever 4 is suitably pivotably connected to a release link 26. Upon pulling link 26 forwardly with the solenoid 22 being deenergized the lever 4 pivots clockwise about plunger 24 and simultaneously pivots about pivot 6 and moves the lanyard pin 8 rearwardly in bore 10 and compresses spring 18 between land 16 and retainer means 20. Upon release of the link 26 the link 26 moves rearwardly and the bias of spring 18 moves pin 8 forwardly.

With solenoid 22 electrically energized, the plunger 24 is retracted and lever 4 pivots about pivot 6 and pin 8 is not moved rearwardly. For a more detailed description of such operation of a trigger unit see U.S. Pat. No. 4,266,462.

Housing 2 is provided with a downwardly open upwardly extending opening or window 28 which is, when pin 8 is in the forward or closed position of FIG. 1, rearwardly adjacent the forward end of pin 8. Housing 2 has a surface 30 at the forward side of opening 28 which is essentially engaged by the forward flat end portion 32 of head portion 12 so that pin 8 extends, when in its forward position, across the lower end of opening 28. Movement of pin 8 between its forward and rearward positions is controlled by the engagement of pivot 6 with housing 2 as is known. The flat end portion 32 is at the upper portion of head portion 12 while the lower forward surface 34 of head portion 12 slopes downwardly and rearwardly from portion 32. Portion 32 is approximately one-fifth the height of head portion 12 to provide an elongated surface 34 for engagement with a lanyard ring 36 of a lanyard.

Housing 2 is also provided with an elongated vertically extending open ended bore 38 with the lower end thereof in open communication with opening 28 and the upper end thereof in open communication with the exterior of housing 2. A latch pin 40 is slidably received within the lower end of bore 38 and the upper end of bore 38 is suitably threaded to threadedly receive an elongated stop 42 therein. An elongated open coiled helical spring 44 is located between the lower end of stop 42 and the upper end of pin 40. In order to prevent the pin 40 from passing through the lower end of bore 38 pin 40 has an uppermost laterally outwardly extending head portion 46 and a lower elongated portion 48 which passes through the lower end of bore 38. The undersurface of head portion 46 engages a lateral shoulder upwardly adjacent the lower end of bore 38 to limit downward travel of the latch pin 40. The bias of spring 44 can be varied, as is known, by adjusting the position of stop 42 within bore 38.

It is to be realized that the terms forwardly, rearwardly, upwardly, etc. are with reference to the figures and are for convenience in the description of the invention. The device of this invention will operate in any position that will release the lanyard ring 36. Also, the pins 8 and 40 and bores 10 and 38 can be of any suitable cross sectional configuration to provide the operation as described herein. Preferably the springs 18 and 44, portions of pins 8 and 40 and bores 10 and 38 are of a cylindrical configuration for ease in manufacturing. Further, housing 2 is of any suitable structure such as a cast metal to provide the necessary support to the operating parts described herein.

With the described structure it will be noted that as the lanyard pin 8 is moved rearwardly (retracted) from the position shown in FIG. 1 the head portion 12 of pin 8 opens the lower end of window 28 to permit the lanyard ring 36 to be ejected downwardly from the housing 2 under the bias of spring 44 as transmitted through latch pin 40. Accordingly, an unarmed store will be dropped since the retraction of lanyard pin 8 releases (while simultaneously compressing spring 18) ring 36 from the pin 8 so that the lanyard including ring 36 remains attached to the store. During such rearward movement of pin 8 the forward end portion 32 of head portion 12 will clear the lowermost portion of latch pin 40 (i.e., elongated portion 48) to permit the latch pin 40, under the downward bias of spring 44, to move downwardly pushing lanyard ring 36 from its retained position. Pin 40 moves into the space between the end portion 32 and surface 30 which occurs when pin 8 moves rearwardly. Thus, pin 40 during such downward movement forces ring 36 to be displaced from its latched position. With pin 40 in the lower position as shown in FIG. 2 the flat end portion 32 engages the rearward portion of lower portion 48 of pin 40 to maintain pin 8 in the retracted position. Lower portion 48 remains downwardly biased to maintain the lanyard pin 8 in the retracted position until such time as pin 40 is reset by being forced upwardly into the position shown in FIG. 1. With pin 8 so located spring 18 remains compressed and biases pin 8 forwardly. With lower portion 48 in such lowermost position it is necessary to force the latch pin 40 upwardly against the bias of spring 44 to permit the pin 8 to move forwardly into the forward latched position under the bias of spring 18. Thus, with pin 8 in the unlatched or rearward position as shown in FIG. 2, in securing a store to an aircraft a ring 36 of a lanyard is forced upwardly into engagement with the lowermost end of portion 48 to force the latch pin 40 upwardly, against the bias of spring 44, until ring 36 clears pin 8 to permit pin 8 to move forwardly through the opening of latch ring 36—i.e., the opening of ring 36 encompasses pin 8. Once ring 36 is so captively located on pin 8, no secondary latching actions or movement of a lanyard pin is required.

The latching of ring 36 is assisted by the upwardly and forwardly sloped surface 34 which engages the upper end of ring 36 and directs the ring 36 to a position at the lower end of latch pin 40, it being noted that the upper end of sloped surface 34 is generally in the same plane as the lower end of latch pin 40 when latch pin 40 is in its lowermost position. With the ring 36 and latch pin 40 so aligned, the store, and hence ring 36, is moved further upwardly to move the pin 40 upwardly. Such upward movement of the ring 36 continues until the upper portion of the ring 36 clears the upper surface of the head portion 12 and upon so clearing the pin 8 under the bias of spring 18, moves forwardly into the latched position as shown in FIG. 1. Pin 8 moves forwardly until the end portion 32 engages surface 30. The movement of pin 8 into engagement with surfaces 30 produces a defined latching effect so that the installer will know the ring 36 is captively received upon the head portion 12 of pin 8. It will also be noted that during installation, ring 36 compresses spring 44 by interfacing pin 40. This action insures that spring 44 and pin 40 are placed in preloaded position for subsequent operation without requiring any secondary operations. Since ring 36 remains in engagement with the lower end of portion 48 after installation the bias of spring 44 will assist in ejecting ring 36 when pin 8 is unlatched.

Once the trigger unit is latched with ring 36 located in window 28 (as shown in FIG. 1), the release link 26 is moved forwardly to release the store. With solenoid 22 deenergized the lever 4 pivots clockwise about pivot 24 and moves pin 8 rearwardly while simultaneously compressing the spring 18. The head portion moves rearwardly until it clears the latch pin 44 and the ring 36 to permit an unarmed store to drop while simultaneously permitting the latch pin 44 to move downwardly to intersect the flat end portion 32 thus locking pin 8 into its rearward or retracted position. Pin 8 will remain in such retracted position regardless of how lever 4 may be subsequently moved or actuated. Such locking out of pin 8 is positive and can only be overcome by resetting latch pin 44 as described. Alternatively stated, latch pin 44 provides a safety lock to prevent lanyard pin 8 from relatching once the pin 8 is unlatched until the pin 8 is specifically relatched.

When an armed store is dropped the pin 8 is not unlatched and the latch pin 40 remains in the latched position. See U.S. Pat. No. 4,266,462 for the dropping of an armed store. In dropping an armed store the pin 8 does not move rearwardly so that the ring 36 is retained on pin 8 as the store is released.

Having described a preferred embodiment of this invention in accordance with the Patent Statutes, those skilled in the relevant art will be cognizant of the fact that modifications can be made to the described structure without departing from the spirit and scope of this invention. Accordingly, the following claims are to be construed as including modifications of the structures defined herein as would be known to those skilled in the relevant art.

We claim:

1. A trigger unit comprising:
   a housing having an upwardly extending opening therein with an open lowermost end,
   a first movable member carried by said housing for reciprocable movement between and into open and closed positions, said first movable member extending laterally across a lower portion of said opening in said closed position and said first movable member being withdrawn from said lower portion in said open position,
   a second movable member carried by said housing with at least a portion thereof being within said opening from a first location above said first movable member to a second location in the path of movement of said first movable member,
   means cooperable with said housing and said second movable means for biasing said second movable means downwardly with respect to said opening, and
   said first movable means being movable from said closed position to said open position when said second movable means is in said first location, said second movable means moving into said second location when said first movable means is in said open position to prevent said first movable means from movement towards said closed position until after said second movable means is moved at least substantially into said first position.

2. A trigger unit as set forth in claim 1 wherein said housing carries spring means for constantly biasing said first movable member towards said closed position.

3. A trigger unit as set forth in claim 1 wherein said second movable member at least partially occupies the volume displaced by said first movable member.

4. A trigger unit as set forth in claim 1 wherein said first member has an upwardly sloping surface which terminates at the lower end of said second member when said second member is in said first location.

5. A trigger unit as set forth in claim 1 wherein said cooperable means is a compressible spring.

6. A trigger unit as set forth in claim 5 wherein the bias of said compressible spring is adjustable.

7. A trigger unit as set forth in claim 5 wherein said compressible spring is carried by said housing in an aperture extending upwardly from said opening.

8. A trigger unit as set forth in claim 7 wherein adjustment means for varying the bias of said compressible spring is carried in said aperture.

9. A trigger unit as set forth in claim 5 wherein said housing carries spring means for constantly biasing said first movable member towards said closed position.

10. A trigger unit as set forth in claim 9 wherein said first movable member is biased into positive engagement with said second movable member when said second movable member is in said second location.

11. A trigger unit as set forth in claim 9 wherein the bias axes of said first and second members are essentially perpendicular.

12. A method of preventing the undesired release of an armed airborne store having an arming lanyard with a loop encircling a lanyard pin which pin is movable between and into latched and unlatched positions with respect to such loop comprising,
   biasing a member for movement in a direction transversely of the path of movement of such a lanyard pin,
   moving said member into a position to prevent said pin from returning to the latched position thereof once said pin has moved out of the latched position,
   and reestablishing the bias on said member while permitting said pin to move into the latched position thereof.

13. The method as set forth in claim 12 wherein constant biasing of said pin occurs.

14. The method as set forth in claim 12 wherein constant biasing of said pin along an axis essentially perpendicular to the bias axis of said member occurs.

15. The method as set forth in claim 12 wherein said member positively engages said pin after said movement thereof.

16. The method of claim 12 wherein said member moves captively with respect to a housing supporting such lanyard pin.

* * * * *